Patented July 4, 1950

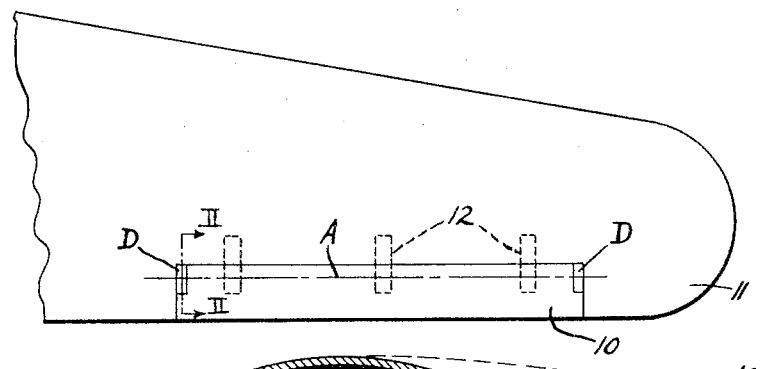
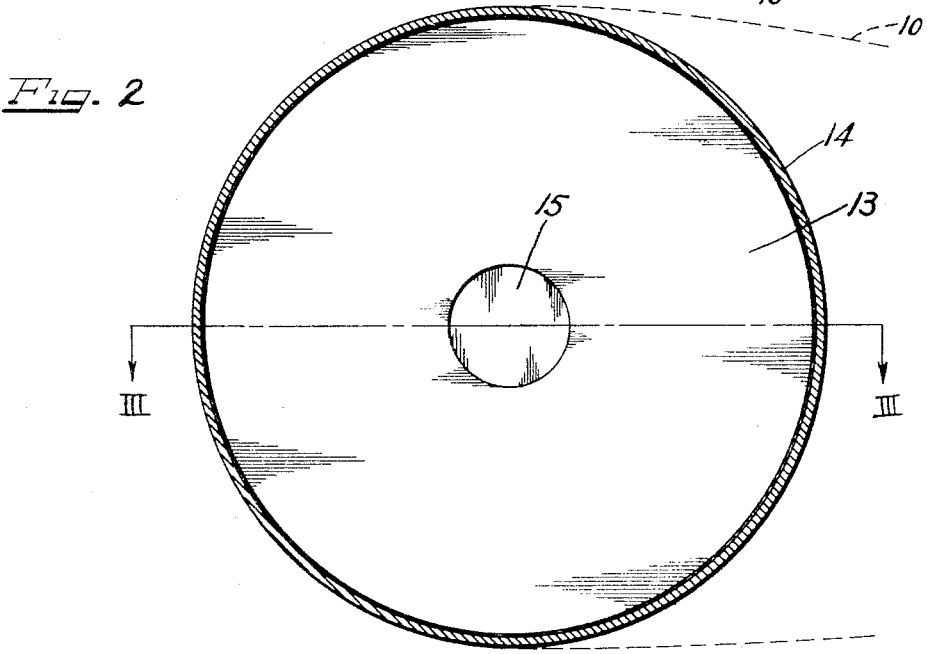
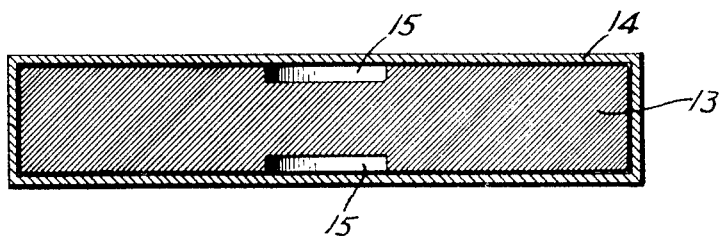

2,514,138

UNITED STATES PATENT OFFICE 2,514,138

VIBRATION DAMPER

Bernard E. O'Connor, Buffalo, N. Y., assignor to Houdaille-Hershey Corporation, Detroit, Mich., a corporation of Michigan Application June 7, 1947, Serial No. 753,390

6 Claims. (Cl. 188—1)

This invention relates to improvements in vibration dampers and more particularly concerns the control of vibrations in devices or masses which must be freely oscillatable for operation or control purposes but should be maintained free from oscillatory vibrations.

There are various instances where an operating member must be freely oscillatably movable under operative control but which, for one cause or another, is subject to oscillatory vibrations which are undesirable. Such vibrations have not heretofore been successfully cured because known types of shock absorbers or vibration dampers have been of a character to impose an additional load upon the operating means for the operating member, at least to the extent of destroying its operative sensitivity or speed of response. This has been largely due to the requirement in the prior dampers or shock absorbers for attachment to a relatively non-movable part of the structural organization of which the oscillatory operating member is a part.

A well known and important example of an oscillatory operating member of this character is an aerodynamic control surface such as an aileron, airplane rudder, or an airplane elevator flap. Such aerodynamic control surfaces must be quite readily and freely responsive to pilot control and any load or drag thereon which might be imposed by a conventional shock absorber or damper would be highly undesirable. Yet such aerodynamic control surfaces are notoriously subject to flutter or vibration, oftentimes under certain aerial conditions of such violence as to result in damage to the structure or even loss of the control surface by breaking or falling loose.

It is an important object of the present invention to provide new and improved vibration damping means for oscillatably operable members and which will allow such members to be operated without interference or impairment in efficiency, but will effectively control or prevent vibrations therein and in particular self excited vibrations.

Another important object of the invention is to provide improved vibration-controlling means in oscillatably operable members and which means will be of low manufacturing cost, easy to install and permanently trouble free and continuously effective for the intended purpose.

Other objects, features and advantages of the present invention may be readily apparent from the following detailed description of a certain preferred embodiment thereof taken together with the accompanying one sheet of drawings, in which:

Figure 1 is a fragmentary schematic plan view of an airplane wing, showing an aileron equipped with vibration damping means according to the present invention;

Figure 2 is an enlarged vertical sectional view taken substantially on line II—II of Figure 1; and Figure 3 is a diametrical sectional view taken in the plane of line III—III of Figure 2.

An aerodynamic control surface such as in aileron 10 of an airplane wing 11 is supported oscillatably in any preferred manner as by means of conventional hinges 12, the hinges being located, of course, adjacent to the leading edge of the aileron. Any preferred means within the control of the pilot of the airplane is connected in any preferred manner with the aileron 10 for operating the same to swing up or down as required. Such operating control has not been shown because it can be of any well known construction. The hinges 12 are shown purely diagrammatically since they are obviously of well known construction and are customarily located on the underside of the wing, whereas in Figure 1 a top plan view is shown.

According to the present invention, vibration in the aileron 10 is controlled in a novel manner by equipping the aileron with vibration damping means which during normal oscillatory operational movement of the aileron remains inert, that is, avoids any drag or restraint or imposition of load upon the operational responsiveness of the aileron, but which effectively restrains and dissipates any tendency of the aileron to vibrate. To this end, use is made of a free inertia member strategically supported by the aileron and which permits unrestrained relative movement of the aileron during operational oscillations of the aileron or moves freely with the aileron as part of the general aileron mass, but which tends to remain static or at least lag substantially when the aileron tends to oscillate with vibrational velocity. A coupling medium is provided which becomes effective upon any tendency of the aileron to vibrate, for coupling the inertia member and the aileron so that the tendency of the inertia member to remain static operates to dampen the vibrations.

In a simple and effective form the vibration damping structure comprises a circular relatively thick disk-like inertia member 13 housed within the casing 14. By preference, the casing 14 is so dimensioned internally that a uniformly spaced relation is maintained between at least the broad side faces of the inertia member 13, and preferably also between the periphery of the inertia member and the opposing peripheral wall of the casing. This spacing should be very limited so that the inertia member 13 will be just free for completely unrestrained relative movement within the casing, assuming that the inertia members were uniformly spaced or floating within the chamber provided by the casing 14, as ideally shown in Figures 2 and 3. Within the limited spacing thus provided, is a fill of a viscous fluid, such as a silicone, which provides not only a lubricating film between the inertia member 13 and the casing 14, but affords a yieldable shear resistant coupling between the inertia member and the casing. This will tend by fluid friction to restrain the inertia member and casing against relative oscillatory movements of vibrational magnitude or intensity. On the other hand, the lubrication provided by the viscous fluid permits the inertia member to slide relatively freely within the casing 14 when the casing is moved relatively slowly as compared with vibrational oscillations, but not as slowly as would overcome the inertia of the inertia member and cause it to follow the movements of the casing 14 in a rolling manner. In order to provide a reservoir for viscous fluid, the inertia member 13 may be formed at one or both sides substantially on its axis with a reservoir depression 15.

The aileron 10 is equipped with one or more of the vibration dampers as indicated at D, preferably located at the ends of the aileron and mounted coaxial with the hinge axis identified by the line A. Since in the customary aileron construction, the leading edge portion thereof is relatively thick, as indicated by broken outline in Figure 2, there is ample body in the aileron structure to accommodate the vibration dampers within the aerodynamic surfaces of the aileron and wing, thereby avoiding any protrusions thereof. While a single one of the dampers D might be ample, depending upon the size of the aileron 10, there might be a tendency for torsional vibrations within the aileron structure to develop where the aileron is of considerable length and the damper is applied only to one end. In such cases, the provision of a damper D at each respective end of the aileron will provide more uniform damping. It might also be practicable in certain instances to fit the aileron with but a single damper disposed at the longitudinal center of the structure. However, for most installations it is more expedient to install the dampers at the ends of the aileron.

Through this arrangement, operational oscillations of the aileron are unaffected by the damper, since the controlled movements of the aileron are relatively very slow so that the inertia member or members 14 will either simply roll about their axis as the casing 14 moves with the aileron, or, when the movement is somewhat more rapid the lubrication provided by the film of viscous fluid between the opposing surfaces of the inertia member in the casing will readily permit the casing to move with the aileron while the inertia member remains substantially inert. However, in any tendency of the aileron 10 to vibrate, the inertia of the member 13 acts to hold the same against such rapid movement and the viscous fluid fiilm between the opposing surfaces of the inertia member and the casing 14 affords a coupling which resists movement of the casing 14 with the aileron independently of the inertia member 13, the vibrations being thereby dampened.

It will be readily apparent that the vibration dampers D will function similarly when mounted coaxially with the hinge axis or axis of rotation of a rudder member or an elevator flap of an airplane or when similarly mounted cooperatively with any other operationally oscillatable member of similar character which is subject to torsional vibrations.

I claim as my invention:

1. In combination in an operationally oscillatable member subject to torsional vibrations, a vibration damper including a circular inertia member, a housing for said inertia member fixedly carried by the oscillatable member and providing a free chamber for the inertia member enclosing the latter with very limited spacing between at least the sides of the inertia member, the inertia member being freely supported and rotatably movable within the housing with the walls of the housing providing the sole retaining means for the inertia member, and a viscous fluid in said chamber providing a film of the fluid between the casing and the inertia member affording lubrication for slow relative movement of the inertia member and casing, and a shear film coupling between the inertia member and casing resisting relatively rapid oscillatory vibrational movements therebetween, the damper being mounted with the axis of the inertia member coaxial with the axis of oscillation of the oscillatable member.

2. In combination, a circular inertia mass, a housing for the mass providing a chamber closely spaced from the opposite sides of the inertia mass, and an operationally oscillatable member, said housing being secured to the oscillatable member on the axis of oscillation with the inertia mass concentric with the axis of oscillation of said member, and a viscous fluid shear film in the space between each side of the inertia mass and the housing providing a torsional vibration preventing and damping coupling between the casing and the inertia mass and thereby said member and the inertia mass, said inertia mass and the fluid being the sole means occupying said chamber.

3. In combination in a vibration damper of the character described, a casing, a solid circular inertia disk, the casing providing a chamber for the inertia disk in peripheral and lateral closed spaced relation, a viscous liquid within the spaces between the inertia disk and the casing affording a viscous shear film coupling therebetween, said inertia disk having a depression in at least one side thereof providing a fluid reservoir.

4. In combination in a viscous torsional vibration damper, a circular inertia disk, the casing providing a chamber enclosing the inertia disk in peripheral and lateral closely spaced relation, and a viscous liquid within the spaces between the inertia disk and the casing affording viscous shear film coupling between the inertia disk and opposing walls of the casing in said spaces, said inertia disk and the viscous liquid being the sole means occupying said chamber.

5. In combination in a viscous torsional vibration damper, a housing, a circular inertia element, the housing providing a fully enclosing chamber within which the inertia element is housed and having a circular wall peripherally encompassing the inertia element in closely spaced relation, and a viscous liquid within the chamber and affording a viscous shear film coupling in the space between the periphery of the inertia element and said encompassing wall, said inertia element and said viscous liquid being the sole means occupying the chamber.

6. In combination in a viscous torsional vibration damper, a housing defining a fully closed chamber having side walls in predetermined spaced relation, an inertia disk housed in said chamber, and a viscous liquid in said chamber in company with the inertia disk, said inertia disk and the viscous liquid being the sole operational means occupying said chamber, said inertia disk having side faces in closely spaced, non-frictional relation to the opposing surfaces of said housing side walls when in optimum vibration damping condition and the viscous liquid providing shear film coupling between the opposed side wall surfaces of the inertia disk and the housing resisting relative torsional movements of the housing and disk by reason of the shear strength of the liquid.

BERNARD E. O'CONNOR.

REFERENCES CITED

The following references are of record in the file of this patent:

UNITED STATES PATENTS

| Number | Name | Date |
| --- | --- | --- |
| 1,997,285 | Weymouth | Apr. 9, 1935 |
| 2,013,109 | Reynolds | Sept. 3, 1935 |
| 2,081,957 | Roche | June 1, 1937 |

FOREIGN PATENTS

| Number | Country | Date |
| --- | --- | --- |
| 515,318 | Great Britain | Dec. 1, 1939 |